United States Patent
Kim

(10) Patent No.: US 6,392,720 B1
(45) Date of Patent: May 21, 2002

(54) SUBSTRATE STRUCTURE OF A LIQUID CRYSTAL DISPLAY AND A MANUFACTURING METHOD THEREOF

(75) Inventor: Woong Kwon Kim, Kyoungki-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/213,852

(22) Filed: Dec. 17, 1998

(51) Int. Cl.[7] .................. G02F 1/136; G02F 1/1343
(52) U.S. Cl. .................. 349/42; 349/43; 349/46; 349/139; 349/147
(58) Field of Search .................. 349/43, 46, 139, 349/147, 42; 257/59, 72

(56) References Cited

U.S. PATENT DOCUMENTS 5,852,481 A * 12/1998 Hwang ................ 349/43
6,091,466 A *  7/2000 Kim et al. ............ 349/43

FOREIGN PATENT DOCUMENTS

JP       7104314 A     4/1995

* cited by examiner

*Primary Examiner*—William L. Sikes
*Assistant Examiner*—Tarifur R. Chowdhury
(74) *Attorney, Agent, or Firm*—Birch, Stewart, Kolasch & Birch, LLP

(57) ABSTRACT

An LCD apparatus and a method of manufacturing an LCD is such that an increase in contact resistivity of a metal layer is prevented. A method for manufacturing an LCD includes forming a metal layer including Mo, W or Ta on a substrate, depositing an insulating layer on the metal layer, patterning the insulating layer to expose some portions of the metal layer and removing some thickness of the exposed metal layer. The resulting LCD includes a metal layer having a first region and a second region, the second region of the metal layer having a removed portion which has a thickness of greater than or equal to 100 Å, an insulating layer which covers the first region of the metal layer and a conductive layer which contacts the second region of the metal layer.

10 Claims, 8 Drawing Sheets

SUBSTRATE STRUCTURE OF A LIQUID CRYSTAL DISPLAY AND A MANUFACTURING METHOD THEREOF

BACKGROUND OF THE INVENTION

1. Field of the Invention

A structure and a method of manufacturing a liquid crystal display (LCD) device uses a thin film transistor (TFT) as a switching element. More specifically, structure and a method for manufacturing an LCD in which an increase in contact resistivity of a surface of a metal layer is prevented such that distortion in electrical characteristics caused by such an increased contact resistivity is prevented.

2. Description of the Background Art

Generally, a substrate of a conventional LCD includes a plurality of a gate bus lines 60 and a plurality of data bus lines 70, which are arranged to cross each other and are perpendicular to each other as shown in FIG. 1. In an area surrounding adjacent ones of the gate bus lines 60 and the data bus lines 70, a pixel electrode 80 is disposed. At the intersection portion of the gate bus line 60 and the data bus line 70, a TFT 37 which is connected to the pixel electrode 80 is provided.

The TFT 37 includes a gate electrode 61 which is derived from the gate bus line 60, a source electrode 71 which is derived from the data bus line 70, a drain electrode 72 which faces the source electrode 71 and a semiconductor layer 90 which is located between the source electrode 71 and the drain electrode 72.

According to FIG. 1, the pixel electrode 80 has a portion which overlaps with some portions of the gate bus line 60. This overlapping portion of the pixel electrode 80 is a storage capacitor 33 for supporting a voltage which leaks from the pixel electrode 80 through the TFT 37.

Referring to the FIG. 2 (a cross sectional view of the FIG. 1 which is cut along the line II—II), a conventional method of manufacturing the LCD shown in FIG. 1 is explained.

A chromium layer is deposited on a transparent glass substrate 10. After a photoresist is coated on the chromium layer, the chromium layer is patterned by exposing and developing using a mask. The chromium layer is etched by an etchant such as a CAN (Ceric Ammonium Nitrate) to form a gate bus line 60 and a gate electrode 61 which is derived from the gate bus line 60. After that, the remaining photoresist on the patterned chromium layer is removed by an organic solution such as NMP (N-Methyl-Pyrrolidone).

On the substrate which has the gate material (the gate bus line 60 and the gate electrode 61), a gate insulating layer 50 which includes an inorganic material such as $SiN_x$ or $SiO_x$, an intrinsic amorphous silicon and an $n^+$ type impurity doped amorphous silicon are sequentially deposited. A photoresist is then coated on the doped amorphous silicon. After patterning the photoresist by using a mask, the doped amorphous silicon and the intrinsic amorphous silicon are etched to form a semiconductor layer 90 and an ohmic contact layer 100 over the gate electrode 61.

On the entire surface of the substrate 10 which includes the ohmic contact layer 100, a chromium layer is deposited via a sputtering method. After a photoresist is coated on the chromium layer, the photoresist is patterned by exposing and developing using a mask. The chromium layer is etched by an etchant such as a CAN (Ceric Ammonium Nitrate) to form a data bus line 70 on the gate insulating layer 50. At the same time, a source electrode 71 which is derived from the data bus line 70 and a drain electrode 72 which faces the source electrode 71 are formed on the ohmic contact layer 100.

Exposed portions of the ohmic contact layer 100 between the source electrode 71 and the drain electrode 72 are fully removed via a dry etching method. The remaining photoresist on the source materials (the data bus line 70, the source electrode 71 and the drain electrode 72) are removed by an organic solution such as NMP (N-Methyl-Pyrrolidone).

On the substrate having the source materials, a passivation layer 55 is formed by depositing and/or coating $SiN_x$, $SiO_x$ or BCB (Benzocyclobutene) which includes Si functional groups. A photoresist is coated on the passivation layer 55 and patterned by exposing and developing using a mask. By using a dry etching method, the passivation layer 55 is patterned by an etching gas including $SF_6/O_2$ gas or $CF_4/O_2$ gas. After that, a contact hole 30 exposing some portions of the drain electrode 72 is formed.

The detailed mechanism of forming the contact hole 30 is explained hereafter. The Si functional group of the passivation layer 55, especially, the portion of the passivation layer 55 which is exposed through the opening pattern of the mask reacts with the F radical of the etching gas so that the exposed portion of the passivation layer 55 is removed by converting the passivation layer material to a volatile material such as a $SiF_4$. At the same time, the photoresist is removed by ashing with $O_2$ of the etching gas.

On the passivation layer 55 which has the contact hole 30, an ITO (Indium Tin Oxide) layer is deposited. After a photoresist is coated on the ITO layer, the photoresist is patterned by exposing and developing using a mask. The ITO layer is etched by an etchant such as a HCl to form a pixel electrode 80 which is connected to the drain electrode 72 through the contact hole 30.

A gate pad disposed at the end of the gate bus line 60 and a data pad disposed at the end of the data bus line 70 are shown in FIG. 3 which is a cross sectional view. Pads 92 are connected to the output of the driving IC with a TAB (Tape Automated Bonding). The pad 92 is formed when the bus lines (gate bus line 60 and data bus line 70) are formed by using the chromium layer. The pad 92 is exposed through a contact hole formed by patterning with at least one material selected from the gate insulating layer (not shown) and the passivation layer 55 which include SiNx, SiOx or BCB. The pad 92 is connected to a terminal 93 formed by patterning the ITO layer for connecting the output of the driving IC with a TAB. The contact hole for connecting the pad 92 with the terminal 93 is formed by patterning the passivation layer 55 using the etching gas which includes $SF_6/O_2$ gas or $CF_4/O_2$ gas.

When the contact holes which expose the drain electrode 72 and the pad 92 are formed, as shown in FIGS. 2 and 3, the surface of the chromium layer reacts with the etching gas including $SF_6/O_2$ gas or $CF_4/O_2$ gas so that a thin insulating layer 75 is formed on the surface of the chromium layer.

The thin insulating layer 75 substantially increases the contact resistivity with the ITO layer, the pixel electrode 80 and the terminal 93. The increased contact resistivity causes distorted electrical characteristics and inferior performance and image quality of the LCD.

There are two reasons why the thin insulating layer 75 is formed on the chromium layer. First, when the insulating layer (gate insulating layer or passivation layer) includes an organic material such as a BCB, the organic material diffuses the chromium layer so that the thin insulating layer 75 is formed. Second, when the surface of the chromium layer is exposed to the etching gas which includes $SF_6/O_2$ gas or $CF_4O_2$ gas, the thin insulating layer 75 is formed by reacting with the etching gas having the chromium. The detailed mechanism for reacting is certainly not yet revealed. However, based on experience, it has been determined that the contact resistivity of the chromium surface increases when the exposing time that the chromium is exposed to the etching gas is longer as shown in FIG. 4. Rc is the contact resistivity of the chromium surface and T is the exposing time that the chromium surface is exposed to the etching gas.

SUMMARY OF THE INVENTION

To overcome the problems described above, preferred embodiments of the present invention provide an LCD and a method of manufacturing an LCD in which an increase in contact resistivity of a metal layer is prevented. More specifically, the preferred embodiments of the present invention prevent the formation of a thin insulating layer on the metal layer which is connected to another conductive material when a contact hole is formed by patterning an insulating layer which covers the metal layer. Preferred embodiments of the present invention also provide an LCD manufacturing method for maintaining the contact resistivity of a metal layer so that the contact resistivity of the metal layer is not changed or affected by an etching gas which is used for patterning an insulating layer disposed on the metal layer.

To solve the above-mentioned problems in the conventional LCD and the method for manufacturing thereof and to achieve the advantages described in the preceding paragraph, a preferred embodiment of the present invention provides an LCD including a metal layer including Mo, W or Ta having a first region and a second region wherein a portion of the thickness of the second region of the metal layer has been removed so that the second layer has a reduced thickness portion and a portion of a thickness of an insulating layer including $SiN_x$, $SiO_x$ or BCB which covers the first region of the metal layer is removed so that the insulating layer also has a reduced thickness portion.

According to a specific preferred embodiment, an LCD may include a metal layer which has a first region and a second region having a reduced thickness portion formed by removing greater than or equal to 100 Å in thickness of the metal layer, and an insulating layer which covers the first region of the metal layer and a conductive layer which contacts the second region of the metal layer. An additional metal layer can be preferably formed under the metal layer in order to further reduce the resistivity of the metal layer.

According to another preferred embodiment of the present invention, a method of manufacturing an LCD includes the steps of forming a metal layer which includes at least one material that is selected from Mo, W and Ta on a substrate, depositing an insulating layer on the metal layer, patterning the insulating layer to expose some portions of the metal layer and removing some thickness of the exposed metal layer.

According to one preferred embodiment of the present invention, a thickness of the exposed metal layer is preferably about 100 Å. Also, the step of removing the exposed metal layer includes etching the metal layer using etching gas which includes $SF_6/O_2$ gas or $CF_4/O_2$ gas which is used for patterning the insulating layer.

BRIEF DESCRIPTION OF THE ATTACHED DRAWINGS

The present invention will become more fully understood from the detailed description given herein below and the accompanying drawings which are given by way of illustration and therefore not limited to the present invention only and wherein.

DETAILED DESCRIPTION OF PREFERRED EMBODIMENTS

Referring to FIGS. 7a–7j, a preferred embodiment of the present invention will be explained in detail hereafter.

Figure 7A:
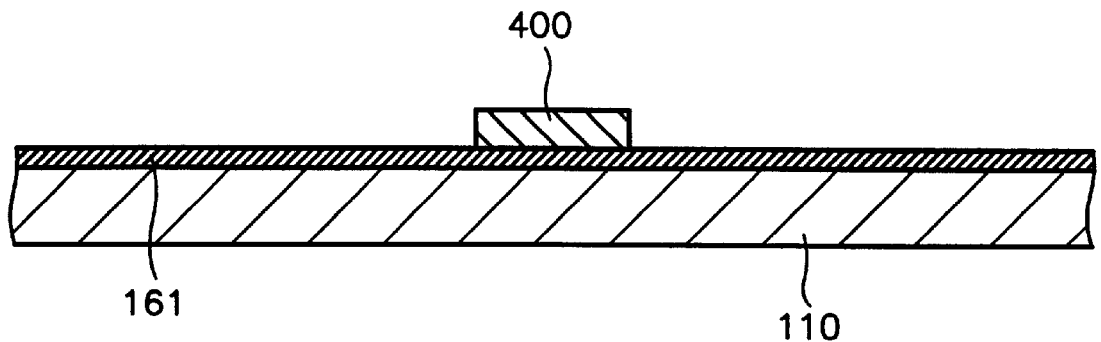
FIGS. 7a–7j are cross-sectional views which show a method of manufacturing a liquid crystal display device according to preferred embodiments of the present invention.

A metal including at least a material that is selected from molybdenum (Mo), tungsten (W) and tantalum (Ta) is deposited on a transparent substrate 110 to form a first metal layer 161. After a photoresist 400 is coated on the first metal layer 161, the photoresist 400 is patterned by exposing and developing using a mask as shown in FIG. 7a.

Figure 7B:
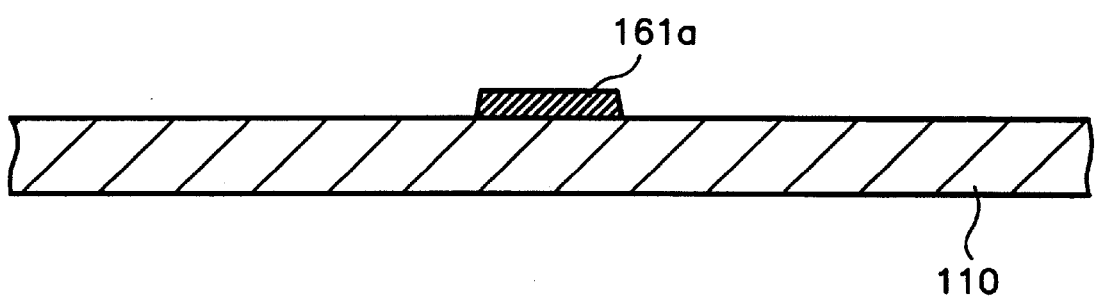

The first metal layer 161 is etched by an etching gas which preferably includes $SF_6/O_2$ gas or $CF_4/O_2$ gas to form a gate bus line (not shown) and a gate electrode 161a which is derived from the gate bus line as shown in FIG. 7b. The etching of the first metal layer 161 is sped up by the first metal layer 161 reacting to an F radical of the etching gas ($SF_6/O_2$ or $CF_4/O_2$) which converts to produce a volatile material. For example, the molybdenum becomes $MoF_6$, the tungsten becomes $WF_3$ and the tantalum becomes $TaF_4$. At the same time, the photoresist is removed by ashing using $O_2$ gas. However, the ashed photoresist may form an insulating layer on the surface of the first metal layer, so that the photoresist should be preferably removed by an organic solution such as a mixture of NMP (N-Methyl-Pyrrolidone), alcohol and amine.

Figure 7C:
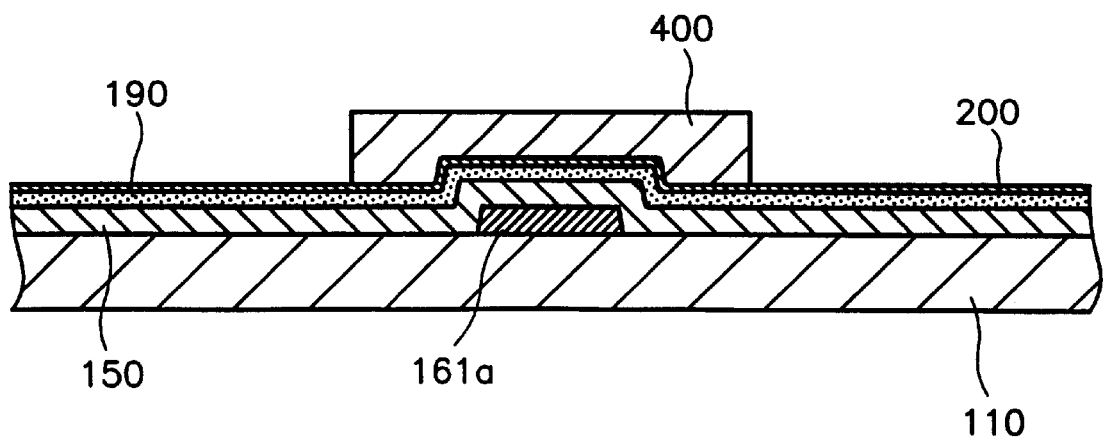

On the substrate which has the gate material (the gate bus line and the gate electrode 161a), a gate insulating layer 150 which includes inorganic materials such as $SiN_x$ or $SiO_x$, an intrinsic amorphous silicon and an $n^+$ type impurity doped amorphous silicon are sequentially deposited. After a photoresist 400 is coated on the doped amorphous silicon, the photoresist 400 is patterned by using a mask as shown in FIG. 7c.

Figure 7D:
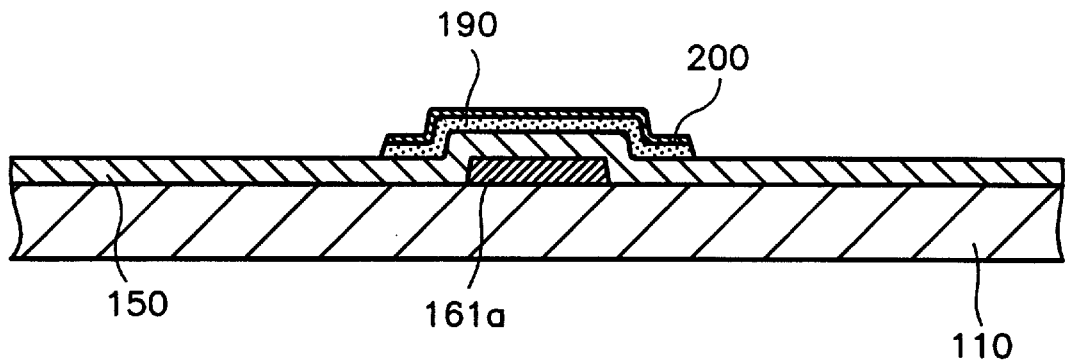

By using the patterned photoresist 400, the doped amorphous silicon and the intrinsic amorphous silicon are etched to form a semiconductor layer 190 and an ohmic contact layer 200, disposed over the gate electrode 161a as shown in FIG. 7d.

Figure 7E:
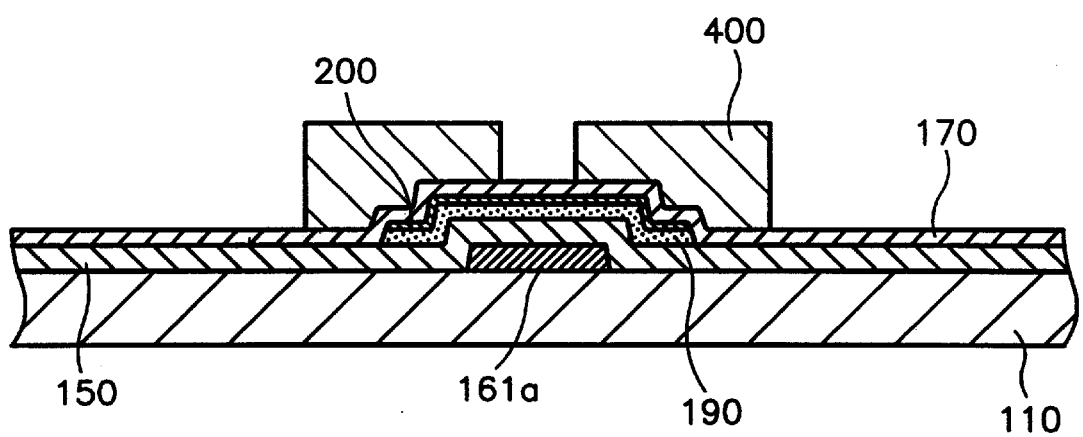

A metal including at least one material that is selected from molybdenum (Mo), tungsten (W) and tantalum (Ta) is deposited on the substrate 110 which has the ohmic contact layer 200 so as to form a second metal layer 170. After a photoresist 400 is coated on the first metal layer 161, the photoresist 400 is patterned by exposing and developing using a mask as shown in FIG. 7e.

Figure 7F:
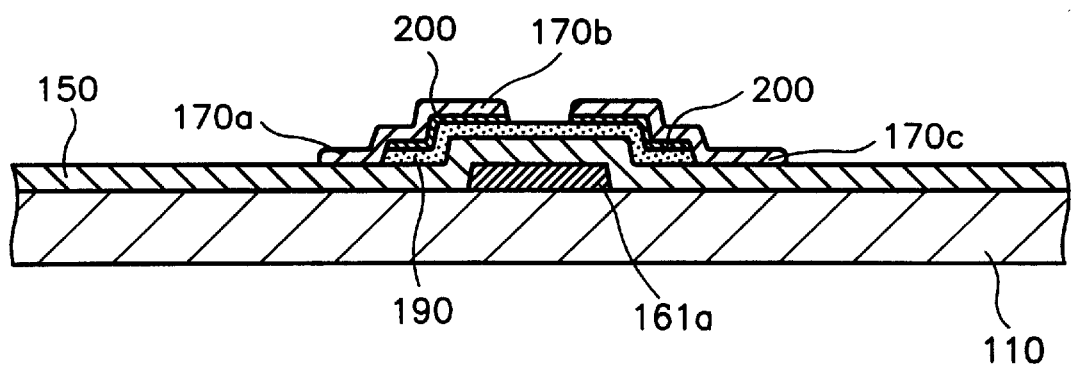

The second metal layer 170 is etched via an etching gas including $SF_6/O_2$ gas or $CF_4/O_2$ gas to form a data bus line 170a, a source electrode 170b which is derived from the data bus line 170a and a drain electrode 170c which faces the source electrode 170b. Removal of the exposed ohmic contact layer 200 between the source electrode 170b and the drain electrode 170c is shown in FIG. 7f. The progress of etching the second metal layer 170 is the same as etching the first metal layer 161. Therefore, a switching element including the gate electrode 161a, the semiconductor layer 190, the source electrode 170b and the drain electrode 170c is formed.

Figure 7G:
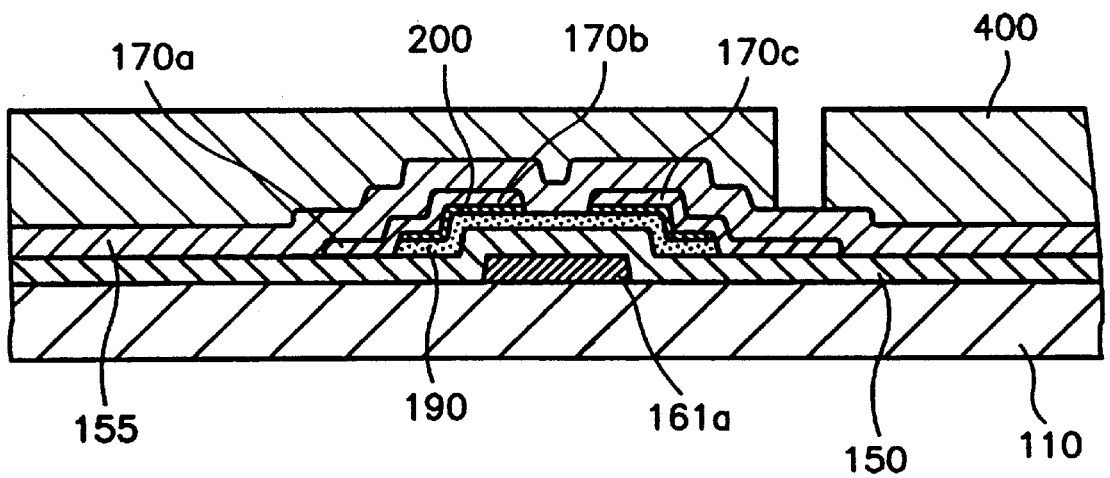

On the substrate 110 which has the source electrode 170b and drain electrode 170c, an insulating material such as SiNx, SiOx or BCB having a Si functional group is deposited and/or coated to form a passivation layer 155. After a photoresist 400 is coated on the passivation layer 155, the photoresist 400 is patterned by using a mask as shown in FIG. 7g. FIG. 7g shows the case of using the SiNx or SiOx as the passivation layer 155. If the BCB is used, then the cross-sectional shape of the passivation layer 155 has a plain surface.

Figure 7H:
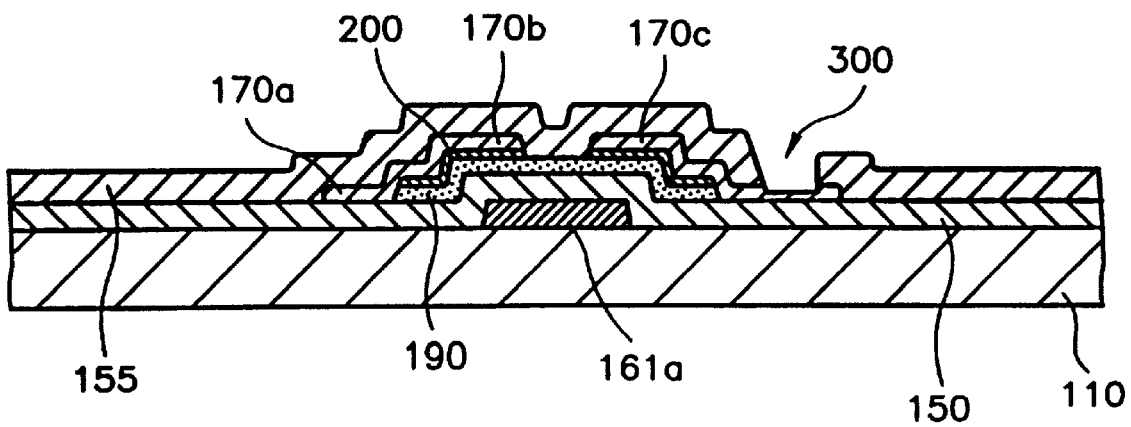

Using the patterned photoresist 400, the passivation layer 155 is etched via an etching gas which includes $SF_6/O_2$ gas or $CF_4/O_2$ gas to form a contact hole 300 exposing some portions of the drain electrode 170c. The etching is continuously performed to remove a certain portion, preferably about 100 Å, of the exposed surface of the drain electrode 170c as shown in FIG. 7h. The patterning of the passivation layer 155 is expedited by a reaction between the Si functional group of the passivation layer 155 and the F radical of the etching gas ($SF_6/O_2$ or $CF_4/O_2$) so as to convert a volatile material to $SiF_4$. The etching of the surface of the exposed drain electrode 170c is expedited by reacting with the F radical of the etching gas so that the surface of the drain electrode 170c converts to a volatile material. For example, the molybdenum becomes $MoF_6$, the tungsten becomes $WF_3$ and the tantalum becomes $TaF_4$. During this process, no impurity results so there is no formation of an insulating layer as in the prior art process, and thus, a completely clean surface of the metal layer is maintained. The reason for removing a certain thickness such as greater than or equal to 100 Å of the exposed drain electrode 155 is to prevent formation of a thin insulating layer which is otherwise formed by diffusing the passivation material into the drain electrode 171c when the passivation material is deposited and/or coated on the drain electrode 171c. At the same time, the photoresist is removed by stripping.

Figure 7I:
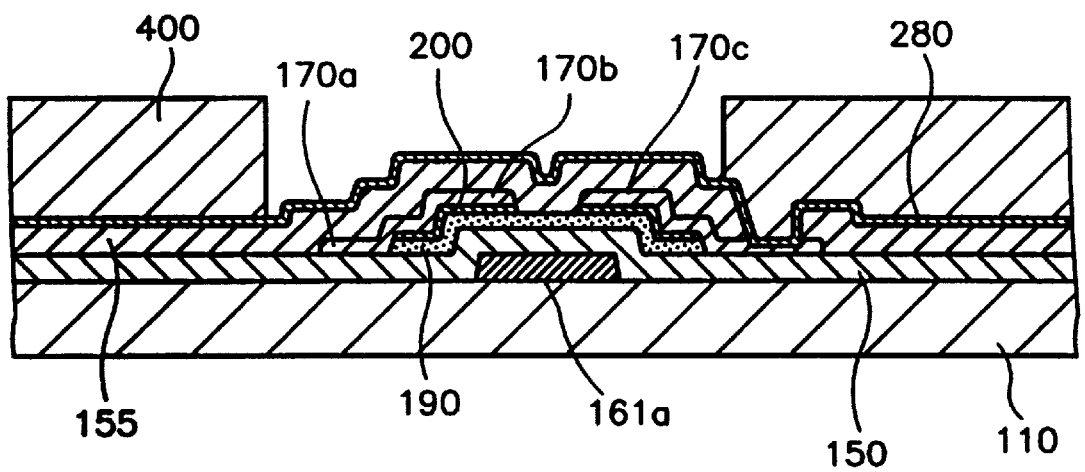

An ITO (Indium Tin Oxide) layer 280 is deposited on the passivation layer 155. After a photoresist 400 is coated on the ITO layer 280, the photoresist 400 is patterned by using a mask as shown in FIG. 7i.

Figure 7J:
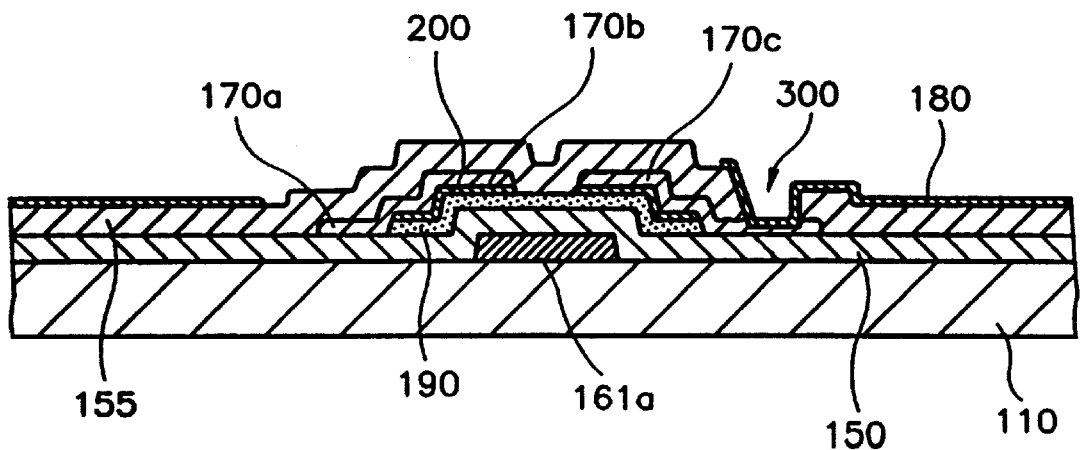

The ITO layer 280 is etched via an etching solution such as HCl to form a pixel electrode 180. The remaining photoresist 400 on the pixel electrode 180 is removed by a mixture organic solution including NMP (N-Methyl-Pyrrolidone), alcohol and amine as shown in FIG. 7j. The pixel electrode 180 is connected to the drain electrode 171c through the contact hole 300.

Figure 8:
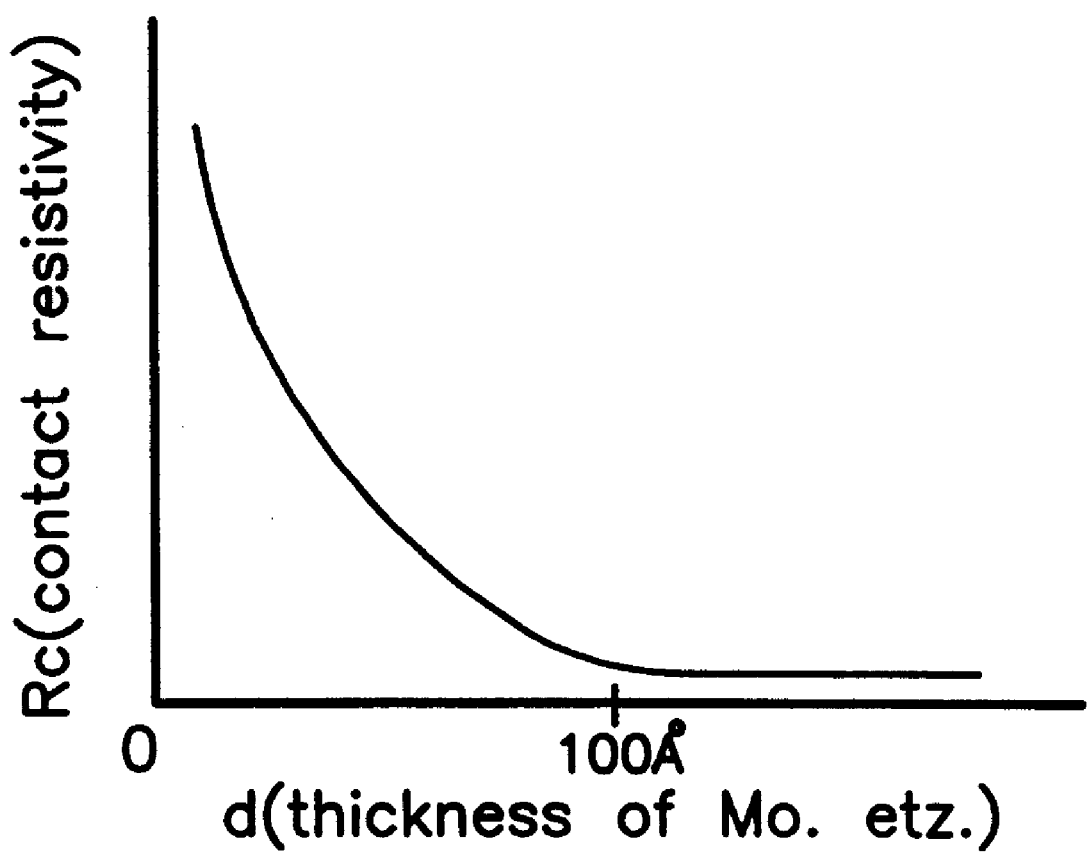
FIG. 8 is a graph which shows a relation between the contact resistivity of a metal layer which includes a material selected from Mo, W and Ta and an etched thickness of the metal layer.

According to preferred embodiments of the present invention, the drain electrode 171c has a thickness of greater than or equal to 100 Å removed therefrom so that there is no intermediate thin insulating layer formed between the drain electrode 171c and the pixel electrode 180. Therefore, the pixel electrode 180 connects directly to the pure material of the drain electrode 171c and the contact resistivity of the pixel electrode 180 and the drain electrode 171c does not increase. In an actual example, when the removed thickness d of the drain electrode 171c is greater than or equal to 100 Å, the contact resistivity of the drain electrode 171c and the pixel electrode 180 has a minimum value as shown in FIG. 8.

Figure 1:
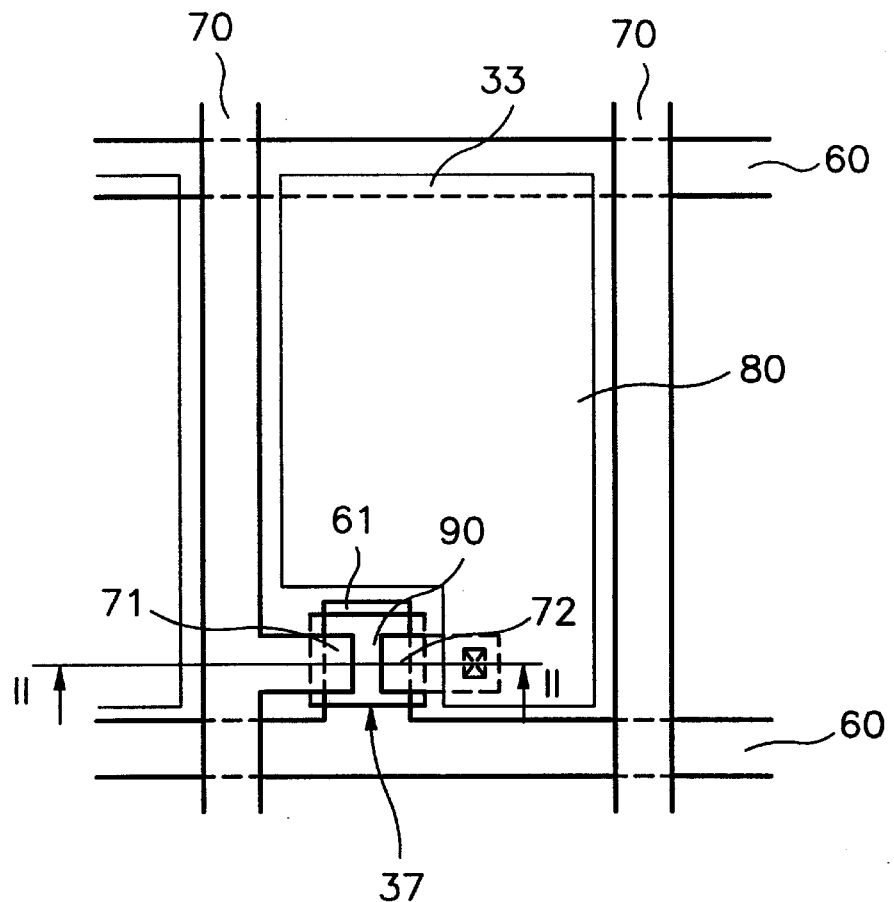
FIG. 1 is a plane view of a conventional liquid crystal display device.
Figure 2:
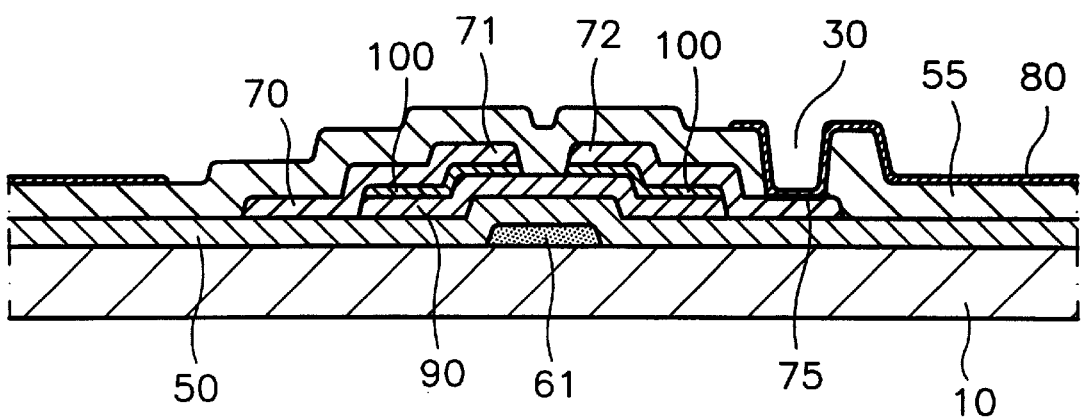
FIG. 2 is a cross-sectional view which shows the conventional liquid crystal display device cut along line II—II of the FIG. 1.
Figure 3:
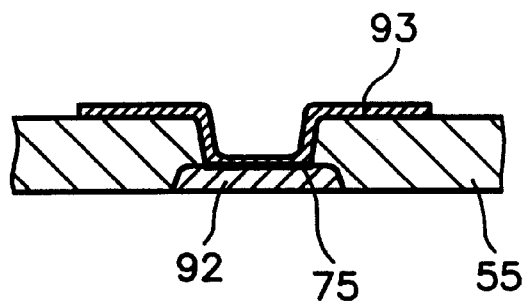
FIG. 3 is the cross sectional view which shows the pad structure of the conventional liquid crystal display device.
Figure 4:
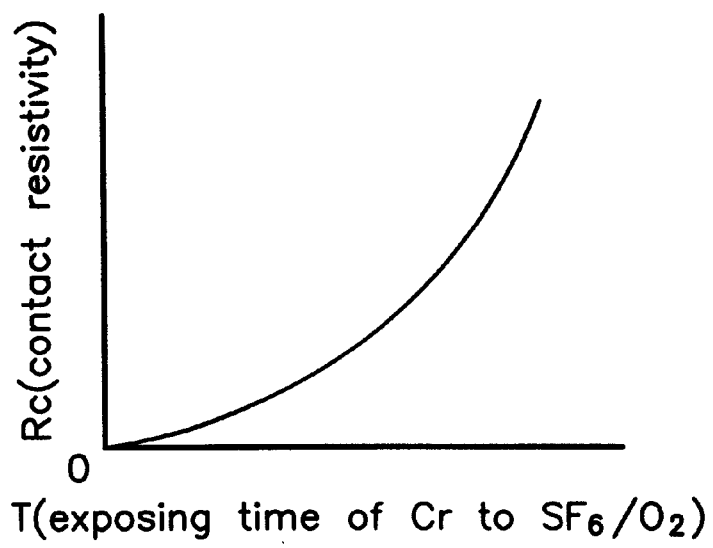
FIG. 4 is a graph which shows a relation between the contact resistivity of the chromium surface and the exposing time that the chromium surface is exposed to etching gas which includes $SF_6/O_2$ gas.
Figure 5:
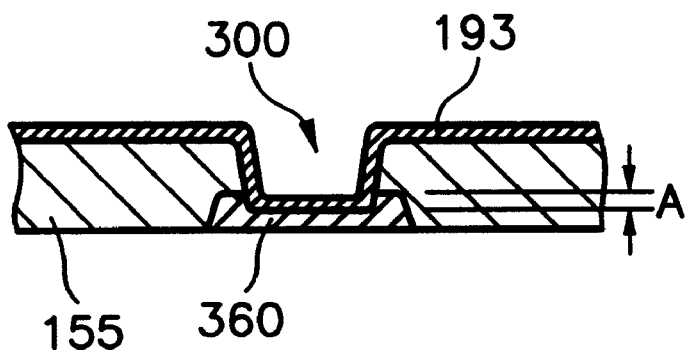
FIGS. 5 and 6 are cross-sectional views which show a structure of a liquid crystal display device according to preferred embodiments of the present invention.

At the end portions of the gate bus line and the data bus line, pads 360 are connected to the output of the driving IC using TAB (Tape Automated Bonding) as shown in FIG. 5. The pad 360 is exposed through a contact hole and connected to a terminal 193 which includes the ITO through the contact hole. The exposed surface of the pad 360 also has a portion having a thickness of greater than or equal to 100 Å removed therefrom and the terminal 193 contacts the etched surface of the pad 360.

Figure 6:
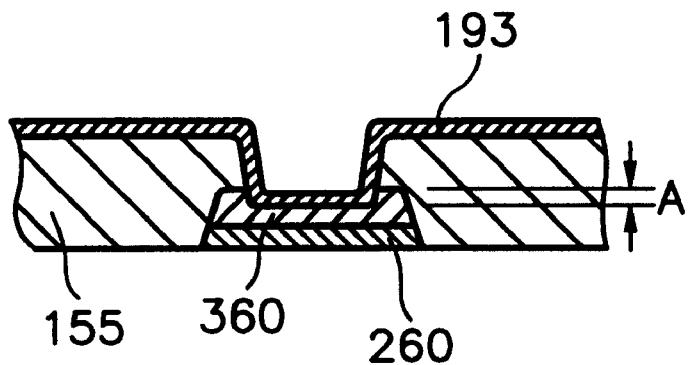

In this preferred embodiment, even though the metal layer is described as having only one layer, the metal layer preferably has an additional metal layer 260 disposed under the layer including Mo, W or Ta as shown in FIG. 6.

As described above, the preferred embodiments of the present invention provides a method of manufacturing an LCD which includes steps of forming a metal layer including at least one material that is selected from Mo, W and Ta on a substrate, depositing an insulating layer on the metal layer, patterning the insulating layer to expose some portions of the metal layer and removing some thickness of the exposed metal layer. Therefore, the LCD according to preferred embodiments of the present invention includes a metal layer having a first region that covers a passivation layer and a second region that has a reduced thickness portion or removed portion having a thickness of greater than or equal to 100 Å thickness and a conductive layer which is disposed in direct contact with the pure metal layer. With this unique method and structure, no intermediate thin insulating layer is formed or present between the metal layer and the conductive layer. As a result, contact resistivity between the metal layer and the conductive layer is prevented from being increased and the LCD does not have any distorted electrical characteristics so that the LCD has a greatly improved picture quality compared to conventional LCDs. In addition, the LCD has an improved shape and excellent step coverage of the metal layer and conductive layer.

While the invention has been particularly shown and described with reference to preferred embodiments thereof, it will be understood by those skilled in the art that the forgoing and other changes in form and details may be made therein without departing from the spirit of the invention.

What is claimed is:

1. A liquid crystal display device comprising:
   a metal layer having a first region and a second region;
   a passivation layer covering the first region of the metal layer; and
   a conductive layer connected to the second region of the metal layer wherein an at least 100 μm thick portion of the second region of the metal layer has been removed so as to define a reduced thickness portion of an exposed surface in the second region of the metal layer, thereby preventing formation of a thin insulating layer between the metal layer and the conductive layer.

2. The liquid crystal display of claim 1, wherein the metal layer comprises at least one material selected from the group consisting of molybdenum, tungsten and tantalum.

3. The liquid crystal display of claim 1, wherein the passivation layer comprises an Si functional group.

4. The liquid crystal display of claim 1, wherein the metal layer includes at least one electrode of a switching element of the liquid crystal display.

5. The liquid crystal display of claim 1, wherein the metal layer includes at least one of a gate pad and a data pad.

6. The liquid crystal display of claim 1, wherein the passivation layer comprises at least one material that is selected from the group consisting of $SiN_x$, $SiO_x$ and BCB having an Si functional group.

7. The liquid crystal display of claim 1, further comprising an additional metal layer disposed under the metal layer.

8. The liquid crystal display of claim 1, wherein the conductive layer connected to the second region of the metal layer is disposed on the passivation layer.

9. The liquid crystal display of claim 1, wherein the conductive layer comprises an Indium Tin Oxide.

10. The liquid crystal device of claim 1, wherein said metal layer is a pure metal layer, and the conductive layer is in direct contact with the pure metal layer.

* * * * *